(12) United States Patent
Hamanaka et al.

(10) Patent No.: US 8,371,750 B2
(45) Date of Patent: Feb. 12, 2013

(54) PHYSICAL QUANTITY DETECTING APPARATUS

(75) Inventors: Yoshiyuki Hamanaka, Kariya (JP); Tsuneo Maebara, Nagoya (JP)

(73) Assignee: Denso Corporation, Kariya (JP)

( * ) Notice: Subject to any disclaimer, the term of this patent is extended or adjusted under 35 U.S.C. 154(b) by 301 days.

(21) Appl. No.: 12/950,083

(22) Filed: Nov. 19, 2010

(65) Prior Publication Data

US 2011/0122917 A1 May 26, 2011

(30) Foreign Application Priority Data

Nov. 20, 2009 (JP) ................................. 2009-265168

(51) Int. Cl.
*G01K 7/00* (2006.01)
(52) U.S. Cl. ......... 374/170; 374/178; 374/166; 374/110
(58) Field of Classification Search .................. 374/170, 374/178, 166, 110
See application file for complete search history.

(56) References Cited

U.S. PATENT DOCUMENTS

| | | | | |
|---|---|---|---|---|
| 3,972,237 | A * | 8/1976 | Turner | 374/169 |
| 7,135,849 | B1 | 11/2006 | Yamamoto | |
| 2005/0264971 | A1* | 12/2005 | Morino | 361/103 |
| 2007/0290905 | A1 | 12/2007 | Kobayashi et al. | |
| 2008/0031304 | A1* | 2/2008 | Nishimura | 374/178 |
| 2008/0054987 | A1* | 3/2008 | Choi et al. | 327/512 |
| 2008/0238529 | A1* | 10/2008 | Kumagai | 327/512 |
| 2010/0002744 | A1* | 1/2010 | Sheahan | 374/1 |
| 2012/0217906 | A1* | 8/2012 | Hamanaka et al. | 318/139 |
| 2012/0250385 | A1* | 10/2012 | Takihara et al. | 363/132 |

FOREIGN PATENT DOCUMENTS

| | | |
|---|---|---|
| JP | 1-103733 | 4/1989 |
| JP | H4-113275 | 4/1992 |
| JP | H10-242858 | 9/1998 |
| JP | 2003-294543 | 10/2003 |
| JP | 2004-117097 | 4/2004 |
| JP | 2006-345230 | 12/2006 |
| JP | 2007-333574 | 12/2007 |
| JP | 2009-171312 | 7/2009 |

OTHER PUBLICATIONS

Japanese Office Action dated Oct. 20, 2011, issued in corresponding Japanese Application No. 2009-265168 with English Translation.

\* cited by examiner

*Primary Examiner* — Mirellys Jagan
(74) *Attorney, Agent, or Firm* — Nixon & Vanderhye PC

(57) ABSTRACT

A physical quantity detecting apparatus includes a plurality of physical quantity conversion circuits, an output selection circuit and a signal conversion circuit. Each of the plurality of physical quantity conversion circuits converts a physical quantity to be detected into a voltage corresponding to the physical quantity and outputs the voltage. The output selection circuit is electrically connected to the plurality of physical quantity conversion circuits to select a maximum voltage from among the voltages outputted from the plurality of physical quantity conversion circuits. The signal conversion circuit is electrically connected to the output selection circuit to convert the voltage outputted from the output selection circuit into a pulse signal having a pulse width or frequency corresponding to the voltage and output the pulse signal.

6 Claims, 2 Drawing Sheets

PHYSICAL QUANTITY DETECTING APPARATUS

CROSS-REFERENCE TO RELATED APPLICATION

This application is based on and claims the benefit of priority from earlier Japanese Patent Application No. 2009-265168 filed Nov. 20, 2009, the description of which is incorporated herein by reference.

BACKGROUND

1. Technical Field

The present disclosure relates to a physical quantity detecting apparatus that detects a physical quantity, such as a temperature, and, in particular, to a physical quantity detecting apparatus that detects a physical quantity in the form of an electrical signal.

2. Related Art

It has been quite important to detect a physical quantity, such as a temperature, and to use the detection information in determining the status of a system. As an example of such a physical quantity detection, JP-A-2009-171312, for example, discloses an on-vehicle information transmission system. The on-vehicle information transmission system detects a temperature which is a physical quantity of an inverter. The on-vehicle information transmission system includes a temperature sensitive diode, a frequency conversion circuit and a photocoupler. The temperature sensitive diode is provided at an inverter to output a voltage corresponding to the temperature of the inverter. The frequency conversion circuit is connected to the temperature sensitive diode to convert the voltage outputted from the temperature sensitive diode into an AC signal having a frequency corresponding to the voltage and to output the AC signal. The photocoupler is connected to the frequency conversion circuit to convert the AC signal outputted from the frequency conversion circuit into a pulse signal and to output the pulse signal, in a state of being electrically isolated from the frequency conversion circuit.

It is desirable that the temperatures at a plurality of positions of an inverter be detected and that the occurrence of a temperature error of the inverter be determined based on a maximum temperature. When the configuration disclosed in the patent document mentioned above is used for detecting the temperatures at a plurality of positions of an inverter, not only a plurality of temperature sensitive diodes, but also a plurality of frequency conversion circuits and a plurality of photocouplers have to be provided, according to the number of positions where temperatures are detected. This raises a problem of allowing a system to have a complicated configuration and of incurring high cost for providing such a system of a complicated configuration.

SUMMARY

Since the situation as set forth above is unfavorable, it is desirable to provide a physical quantity detecting apparatus with a simplified configuration and reduced cost in the case where physical quantities are detected at a plurality of positions.

As one aspect of an embodiment, a physical quantity detecting apparatus includes: a plurality of physical quantity conversion circuits each of which converts a type of physical quantity to be detected into a voltage corresponding to the physical quantity and outputs the voltage; an output selection circuit which is electrically connected to the plurality of physical quantity conversion circuits and which selects a maximum voltage from among the voltages outputted from the plurality of physical quantity conversion circuits; and a signal conversion circuit which is electrically connected to the output selection circuit and which converts the voltage outputted from the output selection circuit into a pulse signal having a pulse width or frequency corresponding to the voltage and outputs the pulse signal.

DETAILED DESCRIPTION OF THE PREFERRED EMBODIMENTS

Figure 1:
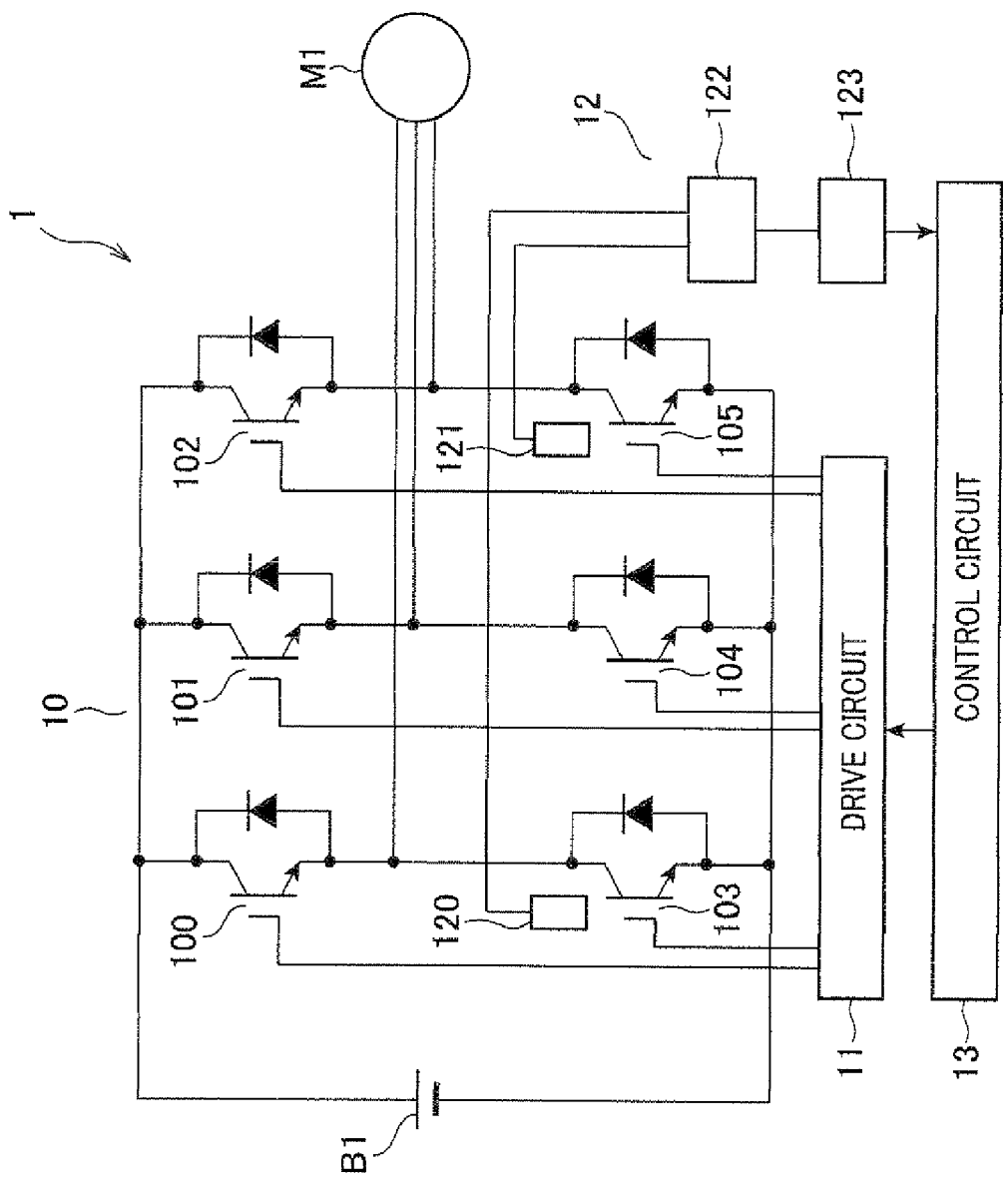
FIG. 1 is a circuit diagram illustrating a motor control apparatus according to an embodiment of the present disclosure.
Figure 2:
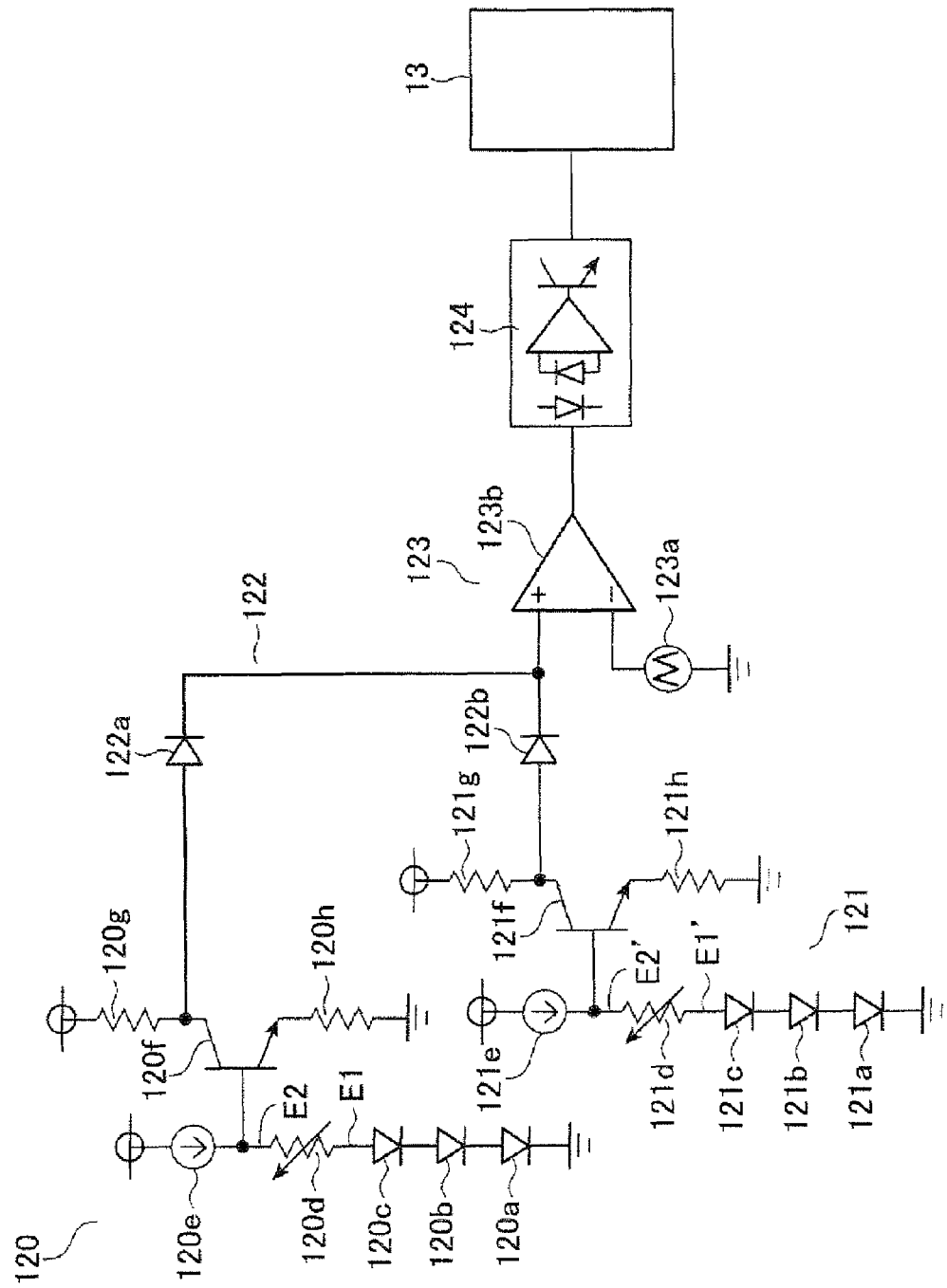
FIG. 2 is a circuit diagram illustrating a temperature detecting apparatus.

With reference to FIGS. 1 and 2, hereinafter is described a physical quantity detecting (measuring) apparatus according to an embodiment of the present disclosure. The present embodiment is described taking an example in which the physical quantity detecting apparatus according to the present disclosure is applied to a motor control apparatus installed in a vehicle.

Referring, first, to FIGS. 1 and 2, the configuration of the motor control apparatus is described. FIG. 1 is a circuit diagram illustrating a motor control apparatus 1 according to the present embodiment. FIG. 2 is a circuit diagram illustrating a temperature detecting (measuring) apparatus.

The motor control apparatus 1 shown in FIG. 1 converts a DC voltage outputted from a battery B1 into a three-phase AC voltage for supply to a three-phase AC motor M1, and drives the three-phase AC motor M1. The motor control apparatus 1 includes an inverter circuit 10 (inverter device), a drive circuit 11, a temperature detecting (measuring) circuit 12 (physical quantity detecting apparatus) and a control circuit 13.

The inverter circuit 10 converts the DC voltage of the battery B1 into a three-phase AC voltage. The inverter circuit 10 is configured by IGBTs (insulated gate bipolar transistors) 100 to 105.

The IGBTs 100 to 105 are switching elements each of which converts a DC voltage to a three-phase AC voltage by being turned on/off. The IGBTs 100 to 105 are mutually closely disposed. The IGBTs 100 and 103 are electrically connected in series. Similarly, the IGBTs 101 and 104, as well as the IGBTs 102 and 105, are also electrically connected in series. The emitters of the IGBTs 100 to 102 are electrically connected to the collectors of the IGBTs 103 to 105, respectively. The serially connected IGBTs 100 and 103, the IGBTs 101 and 104, and the IGBTs 102 and 105 are electrically connected in parallel. The collectors of the IGBTs 100 to 102 are electrically connected to the positive terminal of the battery B1, while the emitters of the IGBTs 103 to 105 are electrically connected to the negative terminal of the battery B1. The gates of the IGBTs 100 to 105 are electrically connected to the drive circuit 11. Serial connection nodes between the serially connected IGBTs 100 and 103, between the serially connected IGBTs 101 and 104, and between the serially connected IGBTs 102 and 105 are electrically connected to the three-phase AC motor M1.

The drive circuit 11 drives the IGBTs 100 to 105 based on drive signals outputted from the control circuit 13. The drive circuit 11 is connected to the control circuit 13, while also being electrically connected to the gates of the IGBTs 100 to 105.

The temperature detecting circuit 12 detects temperatures at a plurality of positions of the inverter circuit 10 and outputs the highest of the temperatures in the form of a pulse signal. The temperature detecting circuit 12 includes temperature conversion circuits 120 and 121 (physical quantity conversion circuits), an output selection circuit 122, a signal conversion circuit 123 and a photocoupler 124 (isolated circuit).

The temperature conversion circuits 120 and 121 convert the temperatures (physical quantities) of the IGBTs 103 and 105, respectively, into voltages corresponding to the temperatures and output the voltages. Specifically, the temperature conversion circuits 120 and 121 convert the temperatures into voltages, which increase with the increase of the temperatures, and output the voltages. As shown in FIG. 2, the temperature conversion circuit 120 includes temperature sensitive diodes 120a to 120c, a correction resistor 120d, a constant current source 120e, a transistor 120f, and resistors 120g and 120h.

The temperature sensitive diodes 120a to 120c are elements whose voltage changes according to temperature. Specifically, forward voltage across the temperature sensitive diodes 120a to 120c is reduced as temperature increases. As shown in FIG. 1, the temperature conversion circuit 120 (temperature sensitive diodes 120a to 120c) is arranged in the vicinity of the IGBT 103. As shown in FIG. 2, the temperature sensitive diodes 120a to 120c of the temperature conversion circuit 120 are mutually connected in series. The anode of the temperature sensitive diode 120a is electrically connected to the cathode of the temperature sensitive diode 120b. Similarly, the anode of the temperature sensitive diode 120b is electrically connected to the cathode of the temperature sensitive diode 120c. The anode of the temperature sensitive diode 120c is electrically connected to the correction resistor 120d. The cathode of the temperature sensitive diode 120a is grounded.

The correction resistor 120d is an element that corrects the voltage of the temperature sensitive diodes 120a to 120c. Specifically, the correction resistor 120d is a variable resistor. One end (end E1) of the correction resistor 120d is electrically connected to the anode of the temperature sensitive diode 120c, while the other end (end E2) thereof is electrically connected to the constant current source 120e.

The constant current source 120e supplies constant current to the temperature sensitive diodes 120a to 120c and the correction resistor 120d. The constant current source 120e is electrically connected to a circuit power supply, while also being electrically connected to the end E2 of the correction resistor 120d.

The transistor 120f and the resistors 120g and 120h are elements that configure a circuit for reversing the voltage at the end E2 of the correction resistor 120d and for outputting the reversed voltage. The base of the transistor 120f is electrically connected to the end E2 of the correction resistor 120d, while the collector thereof is electrically connected to the circuit power supply via the resistor 120g and the emitter thereof is grounded via the resistor 120h.

The temperature conversion circuit 121 includes temperature sensitive diodes 121a to 121c, a correction resistor 121d, a constant current source 121e, a transistor 121f, and resistors 121g and 121h. As shown in FIG. 1, the temperature conversion circuit 121 (temperature sensitive diodes 121a to 121c) is arranged in the vicinity of the IGBT 105. As shown in FIG. 2, the temperature conversion circuit 121 has a configuration similar to that of the temperature conversion circuit 120.

Thus, similar to the temperature conversion circuit 120, one end (end E1') of the correction resistor 121d of the temperature conversion circuit 121 is electrically connected to the anode of the temperature sensitive diode 121c, while the other end (end E2') thereof is electrically connected to the constant current source 121e.

The resistances of the correction resistors 120d and 121d are adjusted so that the voltages at the ends E2 and E2' of the correction resistors 120d and 121d become the same when the temperature detected by the temperature sensitive diodes 120a to 120c is the same as the temperature detected by the temperature sensitive diodes 121a to 121c.

The output selection circuit 122 outputs a maximum voltage from among the voltages outputted from the temperature conversion circuits 120 and 121. The output selection circuit 122 is configured by diodes 122a and 122b. The cathodes of the diodes 122a and 122b are connected to a common node. The anodes of the diodes 122a and 122b are electrically connected to the collectors of the transistors 120f and 121f, respectively. The cathodes of the diodes 122a and 122b are electrically connected, via the common node, to the signal conversion circuit 123.

The signal conversion circuit 123 converts the voltage outputted from the output selection circuit 122 into a pulse signal having a pulse width corresponding to the voltage. The signal conversion circuit 123 includes a triangular-wave signal generation circuit 123a and a comparator 123b.

The triangular-wave signal generation circuit 123a outputs triangular-wave signals having a constant width and constant frequency. The comparator 123b is an element that compares the voltage outputted from the output selection circuit 122 with the triangular wave outputted from the triangular-wave signal generation circuit 123a to thereby convert the voltage into a pulse signal having a pulse width corresponding to the voltage. The comparator 123b has a reverse input terminal which is electrically connected to a signal output terminal of the triangular-wave signal generation circuit 123a. The comparator 123b has a non-reverse input terminal which is electrically connected, via the common node, to the cathodes of the diodes 122a and 122b. The comparator 123b also has an output terminal which is electrically connected to the photocoupler 124.

The photocoupler 124 is an element that outputs the pulse signal outputted from the signal conversion circuit 123, in a state of being electrically isolated from the signal conversion circuit 123. The photocoupler 124 has a signal input terminal which is electrically connected to the output terminal of the comparator 123b. The photocoupler 124 also has a signal output terminal which is electrically connected to the control circuit 13.

The control circuit 13 outputs drive signals for the IGBTs 100 to 105 based such as on an externally inputted command and phase current of the three-phase AC motor M1. The control circuit 13 also has a circuit function of determining a temperature error of the inverter circuit 10 based on the pulse signal outputted from the temperature detecting circuit 12, and performing an appropriate process when a temperature error is determined to have occurred. The control circuit 13 includes a microcomputer. The control circuit 13 is electrically connected to the drive circuit 11, while also being electrically connected to the signal output terminal of the photocoupler 124.

Referring to FIGS. 1 and 2, hereinafter is described the operation of the motor control apparatus 1. In FIG. 1, the control circuit 13 outputs drive signals for the IGBTs 100 to 105 based such as on an externally inputted command. The drive circuit 11 then switches the IGBTs 100 to 105 based on the drive signals outputted from the control circuit 13. Upon switching of the IGBTs 100 to 105, the DC voltage of the battery B1 is converted into a three-phase AC voltage for supply to the three-phase AC motor M1. Then, the three-phase motor M1 is driven.

When the IGBTs 100 to 105 are switched and current is passed therethrough, the temperatures of the IGBTs 100 to 105 increase. Upon increase of the temperatures of the IGBTs 103 and 105, the forward voltages across the temperature sensitive diodes 120a to 120c and across the temperature sensitive diodes 121a to 121c decrease. The voltages across the temperature sensitive diodes 120a to 120c and across the temperature sensitive diodes 121a to 121c are corrected by the correction resistors 120d and 121d, respectively. The transistors 120f and 121f reverse the voltages at the ends E2 and E2' of the correction resistors 120d and 121d, respectively, and output the reversed voltages. In this way, the temperatures of the IGBTs 103 and 105 are converted into voltages that increase with the increase of the respective temperatures, and the resultant voltages are outputted from the temperature conversion circuits 120 and 121.

The output selection circuit 122 outputs a maximum voltage from among the voltages outputted from the temperature conversion circuits 120 and 121. After that, the signal conversion circuit 123 converts the voltage outputted from the output selection circuit 122 into a pulse signal having a pulse width corresponding to the voltage and outputs the pulse signal. Then, the photocoupler 124 outputs the pulse signal outputted from the signal conversion circuit 123, in a state of being electrically isolated from the signal conversion circuit 123.

The control circuit 13 determines as to the occurrence of temperature error in the inverter circuit 10 based on the pulse signal outputted from the temperature detecting circuit 12. If a temperature error is determined to have occurred, the control circuit 13 performs a necessary process, such as stopping switching of the IGBTs 100 to 105.

Finally, the effects of the present disclosure will be described. According to the present embodiment, the output selection circuit 122 is provided upstream of the signal conversion circuit 123 to select a maximum voltage from among the voltages outputted from two temperature conversion circuits 120 and 121. Therefore, unlike the conventional art, it is not necessary to provide the same number of signal conversion circuits as the number of temperature conversion circuits. Thus, in the case of detecting the temperatures at two positions of the inverter circuit 10 installed in a vehicle, the configuration of the motor control apparatus 1 can be simplified and thus the cost involved in providing the motor control apparatus 1 can be reduced.

According to the present embodiment, the temperature conversion circuits 120 and 121 include the temperature sensitive diodes 120a to 120c and the temperature sensitive diodes 121a to 121c, respectively, whose voltages vary according to temperature. Therefore, temperatures, i.e. objects to be detected, are reliably converted into voltages.

According to the present embodiment, the temperature conversion circuits 120 and 121 include the correction resistors 120d and 121d, respectively, which are connected to the temperature sensitive diodes 120a to 120c and the temperature sensitive diodes 121a to 121c, respectively. Thus, variation in the voltage characteristics can be suppressed, the variation being caused by the temperature sensitive diodes 120a to 120c and the temperature sensitive diodes 121a to 121c of the temperature conversion circuits 120 and 121.

According to the present embodiment, the resistances of the correction resistors 120d and 121d are adjusted so that the voltages at the ends E2 and E2' of the correction resistors 120d and 121d become the same when the detected temperatures are the same. Thus, variation in the voltage characteristics can be reliably suppressed, the variation being caused by the temperature sensitive diodes 120a to 120c and the temperature sensitive diodes 121a to 121c of the temperature conversion circuits 120 and 121.

According to the present embodiment, the output selection circuit 122 is configured by the diodes 122a and 122b, with the anodes of the diodes 122a and 122b being connected to the collectors of the transistors 120f and 121f, respectively, and the cathodes thereof being connected, via the common node, to the signal conversion circuit 123. In other words, a wired OR connection is established between the temperature conversion circuits 120 and 121 via the diodes 122a and 122b. Thus, a maximum voltage from among the output voltages from the temperature conversion circuits 120 and 121 can be reliably outputted.

According to the present embodiment, the temperature detecting circuit 12 includes the photocoupler 124. Thus, the pulse signal from the signal conversion circuit 123 can be outputted, being isolated from the circuit power supply.

In the present embodiment, an example has been given in which the signal conversion circuit 123 converts the voltage outputted from the output selection circuit 122 into a pulse signal having a pulse width corresponding to the voltage and outputs the pulse signal. However, no limitation should be imposed by this example. The voltage outputted from the output selection circuit 122 may be converted into a pulse signal having frequency corresponding to the voltage.

In the present embodiment, an example has been given in which the temperature sensitive diodes 120a to 120c and the temperature sensitive diodes 121a to 121c are used to detect temperature. However, no limitation should be imposed by this example. Any elements may be used provided that a temperature can be converted into a voltage corresponding to the temperature, In the present embodiment, an example has been given in which the three temperature sensitive diodes 120a to 120c are serially connected and the three temperature sensitive diodes 121a to 121c are serially connected. However, no limitation should be imposed by this example. Any number of temperature sensitive diodes may be connected in series.

In the present embodiment, an example has been given in which the resistances of the correction resistors 120d and 121d are adjusted so that the voltages at the ends E2 and E2' of the correction resistors 120d and 121d become the same when the temperatures detected by the temperature sensitive diodes 120a to 120c and the temperature sensitive diodes 121a to 121c are the same. However, no limitation should be imposed by this example. The resistances of the correction resistors 120d and 121d may be adjusted so that the voltages at the ends E2 and E2' of the correction resistors 120d and 121d fall within a predetermined allowable range. An error will be caused in this case, however, the error will raise no problem as far as the voltages fall within the predetermined tolerance.

In the present embodiment, an example has been given in which temperature is detected at two positions of the inverter circuit 10, i.e. temperature has been detected for the IGBTs 103 and 105. However, no limitation should be imposed by this example. Temperature may be detected at three or more positions. Alternatively, temperature of all the IGBTs configuring the inverter circuit 10 may be detected. The present embodiment is applicable to the case where temperature is detected at a plurality of positions.

In the present embodiment, an example has been given in which the correction resistors 120*d* and 121*d* are variable resistors. However, no limitation should be imposed by this example. The correction resistors may be thin film resistors or thick film resistors whose resistances can be adjusted by laser trimming.

In the present embodiment, an example has been given in which the temperature sensitive diodes 120*a* to 120*c* and the temperature sensitive diodes 121*a* to 121*c* are arranged in the vicinity of the IGBTs 103 and 105, respectively. However, no limitation should be imposed by this example. Temperature sensitive diodes may be integrally formed with an IGBT.

In the present embodiment, an example has been given in which the object to be detected is temperature. However, no limitation should be imposed by this example. The object to be detected may be the physical quantity other than temperature. For example, the object to be detected may be humidity, pressure, or the like.

Hereinafter, aspects of the above-described embodiments will be summarized.

To achieve a simplified configuration and reduced cost, an output selection circuit is provided upstream of a signal conversion circuit to thereby output a maximum voltage from among voltages outputted from a plurality of physical quantity conversion circuits.

Specifically, according to an embodiment, a physical quantity detecting (measuring) apparatus includes a plurality of physical quantity conversion circuits each of which converts a type of physical quantity to be detected into a voltage corresponding to the physical quantity and outputs the voltage; an output selection circuit electrically connected to the plurality of physical quantity conversion circuits to select a maximum voltage from among the voltages outputted from the plurality of physical quantity conversion circuits; and a signal conversion circuit electrically connected to the output selection circuit to convert the voltage outputted from the output selection circuit into a pulse signal having a pulse width or frequency corresponding to the voltage and output the pulse signal.

Thus, the output selection circuit is provided upstream of the signal conversion circuit to output a maximum voltage from among the voltages outputted from the plurality of physical quantity conversion circuits. Therefore, unlike the conventional art, it is not necessary to provide the same number of signal conversion circuits as the number of the physical quantity conversion circuits. Thus, the configuration is simplified and the cost is reduced when physical quantities at a plurality of positions are detected.

It is preferred that, in the physical quantity detecting apparatus described above, the physical quantity conversion circuits are temperature conversion circuits each of which converts a temperature into a voltage that increases with the increase of the temperature and outputs the voltage.

Thus, the configuration is simplified and the cost is reduced in the case where temperatures at a plurality of positions are detected.

According to another preferred embodiment, in the physical quantity detecting apparatus described above, each of the temperature conversion circuits has a temperature sensitive diode whose voltage changes according to temperature.

Thus, temperatures to be detected are reliably converted into voltages.

It is preferred that, in the physical quantity detecting apparatus described above, each of the temperature conversion circuits includes a correction resistor having one end electrically connected to the temperature sensitive diode to correct voltage of the temperature sensitive diode.

Thus, variation in the voltage characteristics is suppressed, the variation being caused by the temperature sensitive diodes of the plurality of temperature conversion circuits.

Further, in the physical quantity detecting apparatus described above, it is preferred that resistance of each of the correction resistors is adjusted so that voltage at the other end of each of the correction resistors of the plurality of temperature sensitive circuits falls within a tolerance when temperatures detected by the temperature sensitive diodes of the plurality of temperature conversion circuits are the same.

Thus, variation in the voltage characteristics is reliably suppressed, the variation being caused by the temperature sensitive diodes of the plurality of temperature conversion circuits. It is more preferred that the resistances of the correction resistors are adjusted so that the voltages will be the same when the detected temperatures are the same.

Furthermore, it is also desirable that, in the physical quantity detecting apparatus described above, the output selection circuit includes a plurality of diodes; and the plurality of diodes have cathodes electrically connected to a common node and have anodes electrically connected to the respective temperature conversion circuits, the cathodes being electrically connected to the signal conversion circuit via the common node.

Thus, a maximum voltage is reliably outputted from among the output voltages of the plurality of temperature conversion circuits.

Also, it is desirable that the physical quantity detecting apparatus described above includes an isolated circuit which is connected to the signal conversion circuit and which outputs the pulse signal outputted from the signal conversion circuit, in a state of being electrically isolated from the signal conversion circuit.

Thus, the output signal of the signal conversion circuit can be isolated.

Further, in the physical quantity detecting apparatus described above, the temperature conversion circuits may be adapted to detect temperatures of an inverter device installed in a vehicle.

Thus, the configuration is simplified and the cost is reduced in the case where temperatures are detected at a plurality of positions of an inverter device installed in a vehicle.

It will be appreciated that the present invention is not limited to the configurations described above, but any and all modifications, variations or equivalents, which may occur to those who are skilled in the art, should be considered to fall within the scope of the present invention.

What is claimed is:

1. A physical quantity detecting apparatus comprising:
   a plurality of temperature conversion circuits, each of which has a temperature sensitive diode in which forward voltage is decreased as temperature increases, converts a voltage of the temperature sensitive diode, which is decreased as temperature increases, to a voltage, which is increased as temperature increases, and outputs the voltage;
   an output selection circuit which is connected to the plurality of temperature conversion circuits and which selects a maximum voltage from among the voltages, which are increased as temperature increases and are outputted from the plurality of temperature conversion circuits; and
   a signal conversion circuit which is connected to the output selection circuit and which converts the voltage outputted from the output selection circuit into a pulse signal having a pulse width or frequency corresponding to the voltage and outputs the pulse signal.

2. The physical quantity detecting apparatus according to claim 1, wherein the output selection circuit includes a plurality of diodes, and the plurality of diodes have cathodes connected to a common node and have anodes connected to the temperature conversion circuits, each of the cathodes being connected to the signal conversion circuit via the common node.

3. The physical quantity detecting apparatus according to claim 1, further comprising an isolated circuit which is connected to the signal conversion circuit and which outputs the pulse signal outputted from the signal conversion circuit, in a state of being electrically isolated from the signal conversion circuit.

4. The physical quantity detecting apparatus according to claim 1, wherein the temperature conversion circuits detect temperatures of an inverter device installed in a vehicle.

5. The physical quantity detecting apparatus according to claim 1, wherein each of the temperature conversion circuits includes a correction resistor which has one end connected to the temperature sensitive diode and corrects voltage of the temperature sensitive diode.

6. The physical quantity detecting apparatus according to claim 5, wherein resistance of each of the correction resistors is adjusted so that voltage at the other end of each of the correction resistors of the plurality of temperature sensitive circuits falls within a tolerance when temperatures of the temperature sensitive diodes of the plurality of temperature conversion circuits are the same.

* * * * *